Oct. 14, 1958     D. FIRTH     2,856,211
SHAFT BUSHING
Filed Sept. 23, 1953
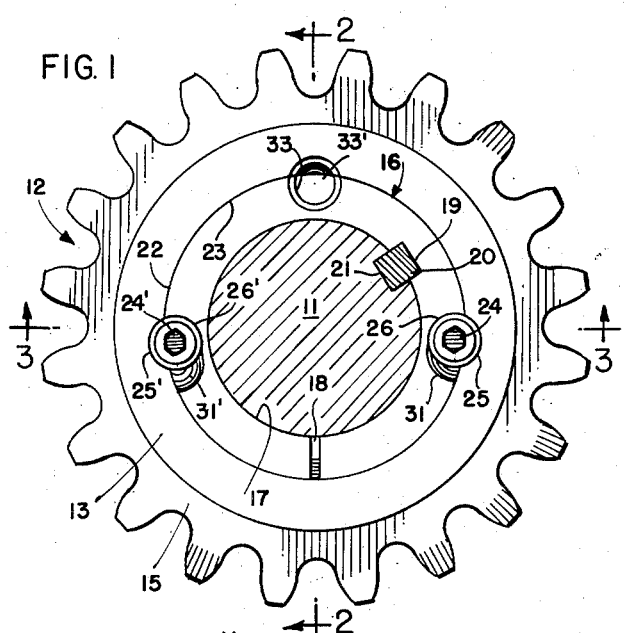
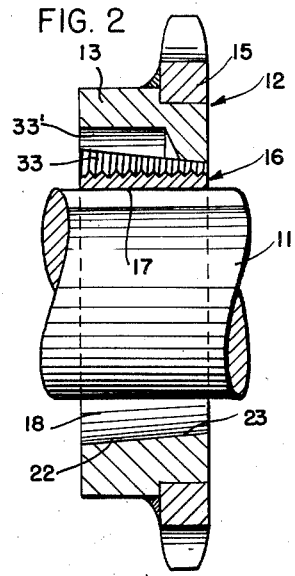
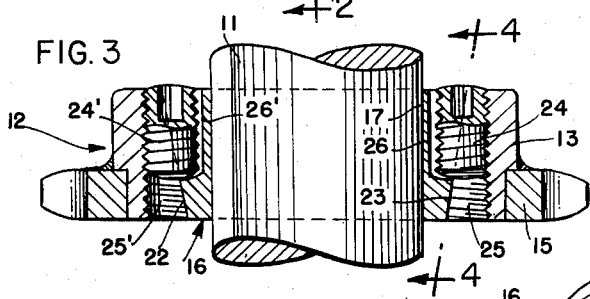
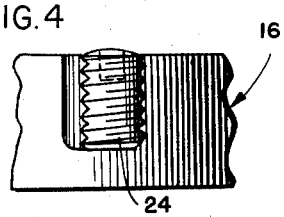
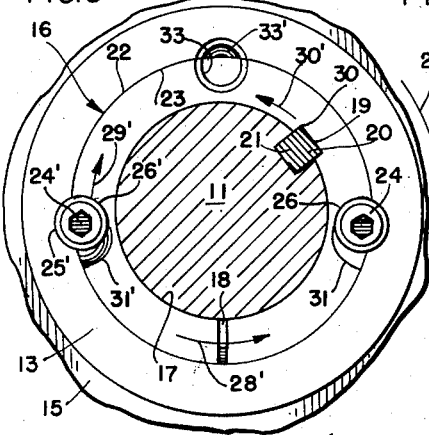
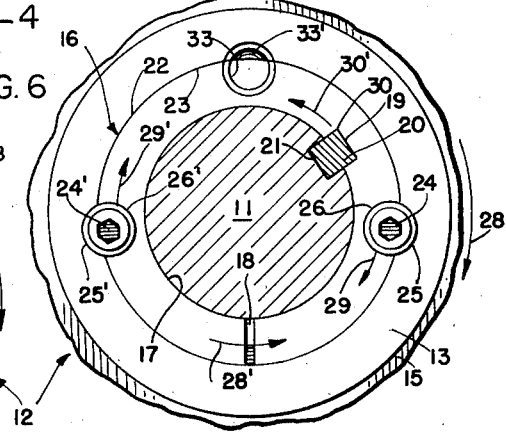
INVENTOR:—
DAVID FIRTH
BY:—
Marzall, Johnston, Cook & Root
ATT'YS United States Patent Office 2,856,211
Patented Oct. 14, 1958

2,856,211

SHAFT BUSHING

David Firth, South Bend, Ind., assignor to Dodge Manufacturing Corporation, Mishawaka, Ind., a corporation of Indiana Application September 23, 1953, Serial No. 381,850

4 Claims. (Cl. 287—52.06)

The present invention relates in general to shaft bushings, and has more particular reference to tapered bushings for the shaft mounting of sprockets, gears, pulleys and other wheel-like elements, the invention pertaining more especially to tapered lock shaft bushings of the sort shown in United States Letters Patent No. 2,402,743, which was issued June 25, 1946, on the invention of David Firth.

The aforesaid patent discloses a split bushing adapted for snug slip fitted and keyed engagement upon a shaft, the outer surface of the bushing being tapered in an axial direction to wedgingly fit within the correspondingly tapered hub of a wheel element to be mounted on the shaft, the structure including a pair of fastening screws threadingly engaged in half pockets formed in the tapered hub engaging surface of the bushing, on opposite sides thereof, the screws being also received in unthreaded cooperating half pockets formed, in the sleeve engaging surface of the hub, in registration with the threaded half pockets of the hub. The unthreaded half pockets are provided with bottoms for bearingly receiving the ends of said screws, whereby the same, when tightened in said threaded half pockets against said bearing bottoms of the unthreaded half pockets, may thrust the bushing axially with respect to the hub in a direction to wedgingly secure the hub wheel element on the bushing and to clampingly engage the bushing with the shaft.

When the structure disclosed in the aforesaid Patent No. 2,402,743 is at rest, as initially assembled, all parts of the split bushing are apt to be under compression, since the fastening screws do not fit tightly in the pockets and the bushing, accordingly, is in frictional engagement only with the shaft and wheel. This condition may persist while the structure is driven in either direction, by force applied either to the shaft to drive the wheel element or to the wheel element to drive the shaft, until the transmitted driving torque exceeds the strength of the frictional driving engagement of the bushing with the shaft and wheel. When this occurs the bushing may slip and consequently turn angularly with respect to the shaft and wheel, and hence place the bushing sleeve under tension in the portions thereof which transmit the driving force, said force transmitting portions being those which extend between the driving key and the fastening screw which leads the key, when driving power is applied to the wheel, and the portions which extend between the driving key and the fastening screw which trails the key, when driving power is applied to the shaft. The sleeve bushing accordingly is likely to fracture in service at its point of minimum section within the portion thus placed in tension. This fracturing tendency is especially evident where the structure is employed for the transmission of driving power of non-uniform jerky character, as where the wheel element comprises a chain sprocket.

An important object of the present invention is to provide a construction of the character mentioned wherein the above noted tendency toward fracture is entirely eliminated in the sleeve bushing.

Another important object is to provide a structure of the character mentioned, including a sleeve bushing, wherein the parts are so formed and arranged that the driving force is applied through the sleeve bushing in manner placing the force transmitting portions thereof in compression, whereby to minimize the likelihood of fracture of the bushing in service.

The foregoing and numerous other important objects, advantages and inherent functions of the invention will become apparent as the same is more fully understood from the following description, which, taken in conjunction with the accompanying drawings, discloses preferred embodiments of the invention.

Referring to the drawings:

Fig. 1 is an end view of a shaft fitted with bushing mounted wheel means embodying the present invention;

Figs. 2 and 3 are sectional views respectively taken substantially along the lines 2—2 and 3—3 in Fig. 1;

Fig. 4 is a sectional view taken along the line 4—4 in Fig. 3;

Fig. 5 is a view of portions of the structure shown in Fig. 1, and

Fig. 6 is a plan view of a bushing of the sort shown in Patent No. 2,402,743 for purposes of comparison.

To illustrate the invention, the drawings show a shaft 11, a power transmitting wheel element 12 having a hub 13 and a rim 15, and a sleeve bushing 16 of suitable material, such as cast iron, for drivingly connecting the wheel with the shaft. While the present invention is not necessarily restricted to the form, shape or configuration of the wheel element 12, but may have application to any type of shaft mounted wheel, including disk wheels, spoked wheels, gears, pulleys and rollers, the drawings show a wheel in which the peripheral portions 15 are formed to provide sprocket teeth whereby the wheel constitutes a sprocket for driving engagement, as with a suitable chain.

The bushing 16 is formed with inner cylindrical surfaces 17 sized to slidingly fit upon the shaft 11. The bushing 16 may also be split longitudinally, as at 18, whereby the bushing sleeve may be compressed inwardly into tight engagement with the shaft. The bushing may also be provided with a longitudinally extending key seat 19 for drivingly connecting the sleeve 16 with the shaft 11, as by means of a key or spline 20 conventionally mounted in the groove 19 of the sleeve, and a key seat groove 21 formed in and longitudinally of the shaft.

The outer surfaces 22 of the bushing sleeve 16 are tapered in one direction to fit within the correspondingly tapered, inwardly facing surfaces 23 of the wheel hub 13, whereby the bushing sleeve may wedgingly extend within the hub 13 and around the shaft 11 to clampingly secure the wheel on the shaft. To this end, clamping screws 24, 24' may be provided for drawing the bushing sleeve 16 within the hub 13 in a direction to wedgingly secure the parts together. These clamping screws may be formed for threaded engagement in half pockets 25, 25' provided in the wheel hub 13, on opposite sides thereof, in position opening laterally inwardly of the tapered wheel hub surface 23, the opposite ends of said screw threaded half pockets also opening at the opposite end faces of the wheel hub. These threaded half pockets 25, 25' are adapted to register with complementary half pocket cavities 26 and 26' formed in the outer tapered surface 22 of the bushing sleeve 16, each of said half pocket cavities opening laterally outwardly of said tapered surface 23 and at one end at an end surface of the sleeve in which formed, the opposite end of each cavity forming an abutment seat 27, 27' for receiving the thrust of a clamping screw.

It should be understood that, as the fastening screws are tightened in the pockets, the bushing sleeve will be squeezed and so compressed between the wheel and shaft. The screws, also, are relatively loose in the unthreaded half pockets 26 and 26'. Accordingly, the driving connection is accomplished initially by the frictional engagement of the bushing sleeve with the shaft and wheel. Such frictional driving engagement, with all parts of the bushing in compression will persist, during operation of the structure for the transmission of power between shaft and wheel, until transmitted driving torque exceeds the strength of the frictional driving connection of the bushing with the wheel. When this takes place in the structure of U. S. Patent No. 2,402,743, here shown in Fig. 6, the bushing 16 will slip within the wheel, to the extent permitted by any looseness or clearance which may exist between the screws 24, 24' and their corresponding half pockets 26, 26'. As a result of such slippage, portions of the bushing sleeve will be caused to operate in tension, whether the shaft drives the wheel or vice versa and regardless of the rotary direction in which the parts move.

For example, if the wheel 13 be driven in a clockwise direction, viewing Fig. 6, as shown by the direction arrow 28, slippage of the bushing with respect to the wheel 13 will take place, as shown by the arrow 28', in a direction opposite to that in which the wheel 13 is driven. The bushing, however, may slip only enough to take up the radial clearance between the clamping screws and the leading sides of the bushing half pocket cavities 26 and 26'. Under such conditions, the driven wheel 13 will apply thrust in the direction of the arrow 28 upon the clamping screws 24 and 24' in the half pockets 25 and 25'. The clamping screws, in turn, will apply thrust upon the bushing sleeve 16, in the same direction, as shown by arrows 29 and 29'. The reaction of the shaft 11 will, of course, represent a force acting in the rotary direction opposite to that in which the wheel 13 is driven, such force being applied to the bushing 16 at and by the trailing side 30 of the spline 20 in the direction indicated by the directional arrow 30'. Accordingly, it will be seen that the sleeve 16 will tend to be in compression, as indicated by the force indicating arrows 29' and 30', throughout the portions thereof which extend between the trailing side 30 of the spline 20 and the clamping screw 24'. The bushing portions of the sleeve 16, which extend between the trailing side 30 of the spline 20 and the leading side of the pocket 26 which contains the clamping screw 24, will be in tension, as shown by the force indicating arrows 29 and 30'.

Materials of which the bushing sleeve may be made are many times stronger in compression than in tension. The strength of cast iron, for example, is of the order of 80,000 pounds per square inch, in compression, as compared with strength of the order of 15,000 pounds per square inch, in tension. As a consequence, when the transmitted driving force exceeds the tensile strength of the material of the bushing sleeve, the same will fracture at its weakest section, in the zone thereof that is loaded in tension. Accordingly, when the wheel 13 is driven in a clockwise direction, in the arrangement shown in Fig. 6, fracture of the bushing 16 is likely to occur at the key seat 19 or in the plane of minimum section at the cavity 26. The same sort of loading and fracture likelihood will occur when the shaft 11 is driven in a counterclockwise direction, viewing Fig. 6.

If the wheel 13, in Fig. 6, be driven in a counterclockwise direction, the bushing 16 will be placed under tension in the zone thereof which extends between the spline 20 and the clamping screw 24', whereby bushing fracture will tend to occur at a weakest portion of said zone, as at the plane of minimum section at the cavity 26', or at the key seat 19. Similar tension loading and fracture likelihood will occur when the shaft 11 is driven clockwise, viewing Fig. 6.

The present invention contemplates the alteration of the arrangement of United States Patent No. 2,402,743 in order that no portion of the bushing sleeve 16 will at any time operate in tension when performing its driving function. To this end, as shown more particularly in Figs. 1 and 5 of the drawings, the half pocket cavities 26 and 26' are enlarged on the sides thereof remote from the keyway 19, by cutting away, relieving or beveling the bushing member 16, as at 31, 31'. When the bushing is so relieved, neither of the clamping screws 24 or 24' may apply thrust upon the key slot remote sides of the half pocket cavities 26 and 26'. This is because the bushing sleeve cannot slip sufficiently, in either direction to cause engagement of the screws 24 or 24' with the relieved sides 31, 31' of the cavities 26, 26'. Accordingly, the screws 24 and 24' may apply thrust upon the bushing 16 respectively only in the direction of the key slot 19. If the wheel 13 be driven clockwise as shown by the arrow 28 in Fig. 5, counterclockwise slippage of the bushing 16 as indicated by arrow 28' will produce thrust of screw 24' only on the bushing as shown by the force arrow 29'. The screw 24 will not apply any thrust on the bushing comparable with the force shown by arrow 29 in Fig. 6. If the wheel be driven counterclockwise the screw 24 will apply counterclockwise thrust upon the bushing sleeve while screw 24' will apply no thrust. In either case the bushing portions which extend between the key and the clamping screws 24 and 24' can never be loaded in tension; but the driving torque will be transmitted through one or other of said portions dynamically loaded in compression. The same will be true when and if the shaft be driven in either direction.

If desired, the wheel hub 13 and the bushing 16 may be formed with a pair of cooperating half pockets 33 and 33' opening upon the tapered surfaces 22 and 23. One of the half pockets, such as the half pocket 33, may be threaded to receive a releasing screw which may be identical to the clamping screws 24, 24', the cooperating half pocket, such as the half pocket 33', being formed with a bottom for engagement with the end of a releasing screw disposed in the cooperating half pockets 33 and 33', such half pocket bottom being comparable to the cavity bottoms 27, 27'. The arrangement of the cooperating half pockets 33 and 33' is such that upon tightening the releasing screw in the threads of one half pocket, the engagement of the screw with the bottom of the cooperating half pocket will draw that portion of the bushing 16 which contains the half pocket 33 axially outwardly from within the hub 13, to thereby disengage the bushing from within the hub after removal of the clamping screws 24 and 24'.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. A tapered bushing for the shaft mounting of a wheel having a hub forming a shaft opening, said bushing being longitudinally split to form a gap therein and being sized to encircle the shaft and to fit within the hub of the wheel, said bushing having an inwardly opening key slot in position to receive a shaft mounted key, said bushing being also formed with a pair of axially extending circumferentially spaced and peripherally opening bushing half pockets disposed in position to register with complementary half pockets in the wheel hub to form sockets for receiving holding and driving members therein, said key slot being disposed in the bushing intermediate said bushing half pockets formed therein, said gap being disposed in the bushing between said bushing half pockets on the sides thereof remote from said key slot, the sides of said bushing half pockets remote from said key slot being cut away so as to be spaced from the holding and driving members to prevent torque transmitting engagement thereof with the socket mounted driving members.

2. A shaft mountable wheel having a hub formed with a tapered bore, a bushing correspondingly tapered for shaft clamping interfitment with said tapered bore, said hub and bushing having registering half pocket pairs formed in the tapered surfaces of said hub and bushing, one half pocket of each pair being threaded for engagement with a clamping screw and the other half pocket of each pair being formed with a screw engaging bottom, and a clamping screw in each of a plurality of pairs of registering half pockets whereby the bushing may be drawn within the hub and clampingly squeezed upon a shaft by action of said clamping screws, said bushing having a longitudinal groove extending along the shaft engaging surface for driving engagement with a shaft mounted key, each pocket having a groove adjacent side and a groove remote side whereby driving force may be transmitted through said bushing between said groove and the groove adjacent sides of the half pockets in said bushing, and means for subjecting the bushing to compressive forces only upon the application of driving force thereto, said means comprising spacing of the groove remote side of the bushing half pockets from the corresponding clamping screws.

3. A shaft mountable wheel having a hub formed with a tapered bore, a bushing correspondingly tapered for shaft clamping interfitment within said tapered bore, said hub and bushing having registering half pocket pairs formed in the tapered surfaces of said hub and bushing, one half pocket of each pair being threaded for engagement with a clamping screw and the other half pocket of each pair being formed with a screw engaging bottom, and a clamping screw in each of a plurality of pairs of registering half pockets whereby the bushing may be drawn within the hub and clampingly squeezed upon a shaft by action of said clamping screws, said bushing having a longitudinal groove extending along the shaft engaging surface for driving engagement with a shaft mounted key, each pocket having a groove adjacent side and a groove remote side whereby driving force may be transmitted through said bushing between said groove and the groove adjacent sides of the half pockets in said bushing, the groove adjacent sides of the bushing half pockets intimately engaging the corresponding screw and the groove remote side of said bushing half pockets being spaced from said screws, whereby the application of driving force to said bushing only subjects the bushing to compression.

4. A shaft mountable wheel having a hub formed with a tapered bore, a split contractible bushing correspondingly tapered for shaft clamping interfitment within said tapered bore, said hub and bushing having registering half pocket pairs formed in the tapered surfaces of said hub and bushing, one half pocket of each pair being threaded for engagement with a clamping screw and the other half pocket of each pair being formed with a screw engaging bottom, and a clamping screw in each of a plurality of pairs of registering half pockets whereby the bushing may be drawn within the hub and clampingly squeezed upon a shaft by action of said clamping screws, said bushing having a longitudinal groove extending along the shaft engaging surface for driving engagement with a shaft mounted key, each pocket having a groove adjacent side and a groove remote side whereby driving force may be transmitted through said bushing between said groove and the groove adjacent sides of the half pockets in said bushing, the groove adjacent sides of the bushing half pockets intimately engaging the corresponding screw and the groove remote side of said bushing half pockets being spaced from said screws, whereby the application of driving force to said bushing only subjects the bushing to compression.

References Cited in the file of this patent

UNITED STATES PATENTS

| | | |
|---|---|---|
| 1,392,915 | Clendenon | Oct. 11, 1921 |
| 1,687,777 | McMurtrie | Oct. 16, 1928 |
| 2,402,743 | Firth | June 25, 1946 |
| 2,509,711 | Williams | May 30, 1950 |